United States Patent
Nikkhoo

(10) Patent No.: US 10,108,011 B2
(45) Date of Patent: Oct. 23, 2018

(54) MICROSPHERE SPACED WAVEGUIDE DISPLAY

(71) Applicant: Microsoft Technology Licensing, LLC, Redmond, WA (US)

(72) Inventor: Michael Nikkhoo, Saratoga, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 507 days.

(21) Appl. No.: 14/600,659

(22) Filed: Jan. 20, 2015

(65) Prior Publication Data

US 2016/0252724 A1    Sep. 1, 2016

(51) Int. Cl.
G02B 27/01    (2006.01)
F21V 8/00    (2006.01)
G02B 27/00    (2006.01)

(52) U.S. Cl.
CPC ......... G02B 27/0172 (2013.01); G02B 6/005 (2013.01); G02B 6/0043 (2013.01); G02B 6/0065 (2013.01); G02B 27/0081 (2013.01); G02B 2027/0178 (2013.01); G02B 2027/0194 (2013.01); G02B 2027/0196 (2013.01)

(58) Field of Classification Search
CPC .. G02B 27/1072; G02B 6/0043; G02B 6/005; G02B 6/0065; G02B 27/0081; G02B 2027/0178; G02B 2027/0194; G02B 2027/0196
USPC ......................................................... 359/630
See application file for complete search history.

(56) References Cited

U.S. PATENT DOCUMENTS

| | | |
|---|---|---|
| 4,740,947 A | 4/1988 | Ohta et al. |
| 5,508,105 A | 4/1996 | Orensteen et al. |
| 6,076,933 A | 6/2000 | DiLoreto et al. |
| 7,067,030 B2 | 6/2006 | Kiuchi et al. |
| 8,049,837 B2 | 11/2011 | Lee |
| 8,183,776 B2 * | 5/2012 | Oh .......................... H01J 11/12 313/585 |

(Continued)

FOREIGN PATENT DOCUMENTS

| | | |
|---|---|---|
| JP | 2014132328 | 7/2014 |
| WO | 2010005655 A2 | 1/2010 |
| WO | 20140130383 A1 | 8/2014 |

OTHER PUBLICATIONS

English language abstract of JP2014132328 published Jul. 17, 2014.

(Continued)

Primary Examiner — William R Alexander
Assistant Examiner — Grant Gagnon
(74) Attorney, Agent, or Firm — Rainier Patents, P.S.

(57) ABSTRACT

The technology provides a waveguide display including an optical waveguide comprising a plurality of separated parallel optical substrates. The substrates are joined by an adhesive configured to have suspended therein a plurality of hard microspheres. The adhesive may be a pressure sensitive adhesive designed to have suspended therein the microspheres. Microspheres may have diameters on the order of a few microns up to 100 microns. The waveguide may be constructed of first and second optical substrates, and a pressure sensitive adhesive including embedded microspheres joining and spacing the substrates apart from each other. Additional substrates may be provided. The technology also provides a method of manufacturing a waveguide.

20 Claims, 4 Drawing Sheets

(56) References Cited

U.S. PATENT DOCUMENTS

| | | | |
|---|---|---|---|
| 8,335,040 B2 | 12/2012 | Mukawa et al. | |
| 8,665,414 B2 | 3/2014 | Powers et al. | |
| 9,110,200 B2* | 8/2015 | Nichol | G02B 6/006 |
| 2012/0218301 A1* | 8/2012 | Miller | G02B 27/017 |
| | | | 345/633 |
| 2013/0251969 A1 | 9/2013 | Sasaki et al. | |
| 2014/0169029 A1 | 6/2014 | Wardhana et al. | |

OTHER PUBLICATIONS

International Search Report and Written Opinion Issued in PCT Application No. PCT/US2016/013123, dated Apr. 21, 2016, 13 Pages.

Nordin, et al., "Analysis of Stacked Rotated Gratings", Brigham Young University BYU ScholarsArchive, Faculty Publications, Mar. 10, 2007, http://scholarsarchive.byu.edu/facpub/933?utm_source=scholarsarchive.byu.edu%2Ffacpub%2F933&utm_medium=PDF&utm_campaign=PDFCoverPages.

"Second Written Opinion Issued in PCT Application No. PCT/US2016/013123", dated Jan. 5, 2016, 7 Pages.

"International Preliminary Report on Patentability Issued in PCT Application No. PCT/US2016/013123", dated Mar. 29, 2017, 8 Pages.

* cited by examiner

MICROSPHERE SPACED WAVEGUIDE DISPLAY

BACKGROUND

Waveguide displays support augmented reality (AR) and virtual reality (VR) experiences. A waveguide display may include a projection light engine that may provide a computer-generated image (CGI), or other information, in the waveguide display. In an AR experience, waveguide display may include optical see-through lens to allow a CGI to be superimposed on a real-world view of a user.

A waveguide display may be included in a head-mounted display (HMD) or head-up display (HUD). The waveguide display may be disposed by a support structure of a head-mounted display (HMD). An HMD may include a waveguide display in a helmet, visor, glasses, and goggles or attached by one or more straps. HMDs may be used in at least aviation, engineering, science, medicine, computer gaming, video, sports, training, simulations and other applications. HUDs may be used in at least military and commercial aviation, automobiles, military, ground and sea transports, computer gaming, and other applications.

SUMMARY

The technology provides a waveguide which may be used in a waveguide display and other applications. The waveguide comprising a plurality of separated parallel optical substrates. The substrates are joined by an adhesive configured to have suspended therein a plurality of hard microspheres which ensure accurate mechanical spacing between the respective substrates. In one embodiment, the adhesive is a pressure sensitive adhesive designed to have the microspheres suspended therein. Microspheres may have diameters on the order of a few microns up several hundred microns. The waveguide may be constructed of first and second optical substrates, and a pressure sensitive adhesive including embedded microspheres joining and spacing the substrates apart from each other. The pressure sensitive adhesive bonds the first substrate to the second substrate and the embedded microspheres ensure accurate spacing between the substrates. Additional substrates may be provided. The technology also provides a method of manufacturing a waveguide.

This Summary is provided to introduce a selection of concepts in a simplified form that are further described below in the Written Description. This Summary is not intended to identify key features or essential features of the claimed subject matter, nor is it intended to be used to limit the scope of the claimed subject matter.

WRITTEN DESCRIPTION

Figure 1:
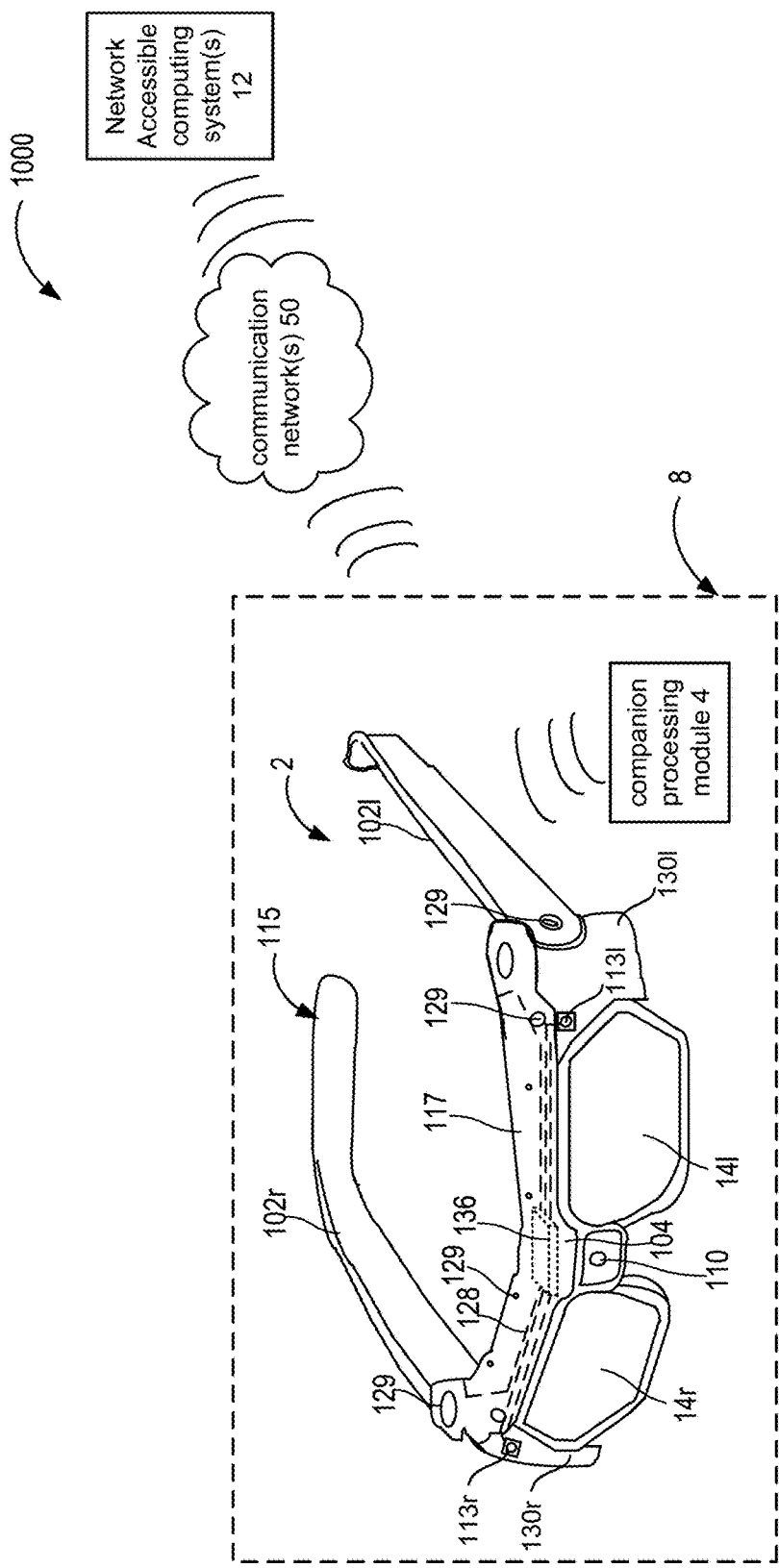
FIG. 1 is a block diagram depicting example components of an embodiment of a near-eye display (NED) device system.

The technology provides a novel construction of an optical structure such as a waveguide comprising a plurality of separated parallel optical substrates. The substrates are joined by an adhesive configured to have suspended therein a plurality of hard microspheres which ensure accurate mechanical spacing between the respective substrates. In one embodiment, the adhesive is a pressure sensitive adhesive designed to have suspended therein the microspheres. Microspheres may have diameters on the order of a few microns up to 100 microns. The waveguide may be constructed of first and second optical substrates, and a pressure sensitive adhesive including embedded microspheres joining and spacing the substrates apart from each other. The pressure sensitive adhesive bonds the first substrate to the second substrate and the embedded microspheres ensure accurate spacing between the substrates. Additional substrates may be provided. The technology also provides a method of manufacturing a waveguide.

Waveguide displays may have an advantage over typical projection displays since the internal mechanisms expand the exit pupil so that a relatively large exit pupil can be generated from a small entrance pupil. The light forming the entrance pupil is generated by a projection light engine that collimates light from a microdisplay, such as a liquid crystal on silicon (LCoS) display. The internal mechanisms replicate the entrance pupil, overlapping these replicated entrance pupils so that the display light has acceptable luminance uniformity. For example, a projection light engine's exit pupil could have a 4 mm exit pupil but the waveguide display may have an exit pupil of 20 mm at the eye plane (or projected exit pupil). Internal mechanism can include two input diffraction gratings that can expand the exit pupil in one direction and then expand the exit pupil in the orthogonal direction.

Waveguides for use in waveguide displays may include multiple substrate, total internal reflection (TIR) waveguides and those using diffractive technologies. Multiple substrate waveguides may utilize a holographic technique where a holographic element is used to diffract the light through the waveguide. Holograms work by reflecting certain wavelengths of light. In this way, the incident light is reflected at a certain angle with regard to the hologram. Holographic elements reflect only one wavelength of light so for full color, three holograms are necessary; one that reflects Red, Green, and Blue respectively.

Diffractive technologies, such as diffractive waveguides, may include surface relief gratings (SRG) and thick phase Bragg gratings. These gratings may have limited angular bandwidth which may reduce the efficiency of a waveguide display system at the edge of FOV. This reduced efficiency may reduce the see-through luminance contrast of a near-eye display. For example, virtual holograms projected on the outside would, by a waveguide display, may appear to fade at the edge of the FOV and may appear less real.

FIG. 1 is a block diagram depicting example components of a waveguide display implemented in a Near Eye Display (NED) system 8 including a compact projection light engine and diffractive waveguide. In the illustrated embodiment, a NED device system 8 includes a near-eye display (NED) device in a head-mounted display (HMD) device 2 and companion processing module 4. HMD 2 is communicatively coupled to companion processing module 4. Wireless communication is illustrated in this example, but communication via a wire between companion processing module 4 and HMD 2 may also be implemented. In an embodiment, HMD 2 includes a NED device having a projection light engine 120 (shown in FIGS. 3A, 3C and 4) and near-eye display 14 having a diffractive waveguide as described in detail herein.

In this embodiment, HMD 2 is in the shape of eyeglasses having a frame 115, with each display optical system 14l and 14r positioned at the front of the HMD 2 to be seen through by each eye when worn by a user. Each display optical system 14l and 14r is also referred to as a display or near-eye display 14, and the two display optical systems 14l and 14r together may also be referred to as a display or near-eye display 14. In this embodiment, each display optical system 14l and 14r uses a projection display in which image data (or image light) is projected into a user's eye to generate a display of the image data so that the image data appears to the user at a location in a three dimensional FOV in front of the user. For example, a user may be playing a shoot down enemy helicopter game in an optical see-through mode in his living room. An image of a helicopter appears to the user to be flying over a chair in his living room, not between optional lenses 116 and 118, shown in FIG. 2B, as a user cannot focus on image data that close to the human eye.

In this embodiment, frame 115 provides a convenient eyeglass frame holding elements of the HMD 2 in place as well as a conduit for electrical connections. In an embodiment, frame 115 provides a NED device support structure for a projection light engine 120 and a near-eye display 14 as described herein. Some other examples of NED device support structures are a helmet, visor frame, goggles support or one or more straps. The frame 115 includes a nose bridge 104, a front top cover section 117, a respective projection light engine housing 130 for each of a left side housing (130l) and a right side housing (130r) of HMD 2 as well as left and right temples or side arms 102l and 102r which are designed to rest on each of a user's ears. In this embodiment, nose bridge 104 includes a microphone 110 for recording sounds and transmitting audio data to control circuitry 136. On the exterior of the side housing 130l and 130r are respective outward capture devices 113l and 113r (such as cameras) which capture image data of the real environment in front of the user for mapping what is in a FOV of a near-eye display (NED) device.

In this embodiment, dashed lines 128 are illustrative examples of some electrical connection paths which connect to control circuitry 136, also illustrated in dashed lines. One dashed electrical connection line is labeled 128 to avoid overcrowding the drawing. The electrical connections and control circuitry 136 are in dashed lines to indicate they are under the front top cover section 117 in this example. There may also be other electrical connections (not shown) including extensions of a power bus in the side arms for other components, some examples of which are sensor units including additional cameras, audio output devices like earphones or units, and perhaps an additional processor and memory. Some examples of connectors 129 as screws are illustrated which may be used for connecting the various parts of the frame together.

The companion processing module 4 may take various embodiments. In some embodiments, companion processing module 4 is in a portable form which may be worn on the user's body, e.g. a wrist, or be a separate portable computing system like a mobile device (e.g. smartphone, tablet, laptop). The companion processing module 4 may communicate using a wire or wirelessly (e.g., WiFi, Bluetooth, infrared, an infrared personal area network, RFID transmission, wireless Universal Serial Bus (WUSB), cellular, 3G, 4G or other wireless communication means) over one or more communication network(s) 50 to one or more network accessible computing system(s) 12, whether located nearby or at a remote location. In other embodiments, the functionality of the companion processing module 4 may be integrated in software and hardware components of HMD 2. Some examples of hardware components of the companion processing module 4 and network accessible computing system(s) 12 are shown in FIG. 7.

One or more network accessible computing system(s) 12 may be leveraged for processing power and remote data access. The complexity and number of components may vary considerably for different embodiments of the network accessible computing system(s) 12 and the companion processing module 4. In an embodiment illustrated in FIG. 1, a NED device system 1000 may include near-eye display (NED) device system 8 (with or without companion processing module 4), communication(s) network 50 and network accessible computing system(s) 12. In an embodiment, network accessible computing system(s) 12 may be located remotely or in a Cloud operating environment.

Image data is identified for display based on an application (e.g. a game or messaging application) executing on one or more processors in control circuitry 136, companion processing module 4 and/or network accessible computing system(s) 12 (or a combination thereof) to provide image data to near-eye display 14.

Figure 2A:
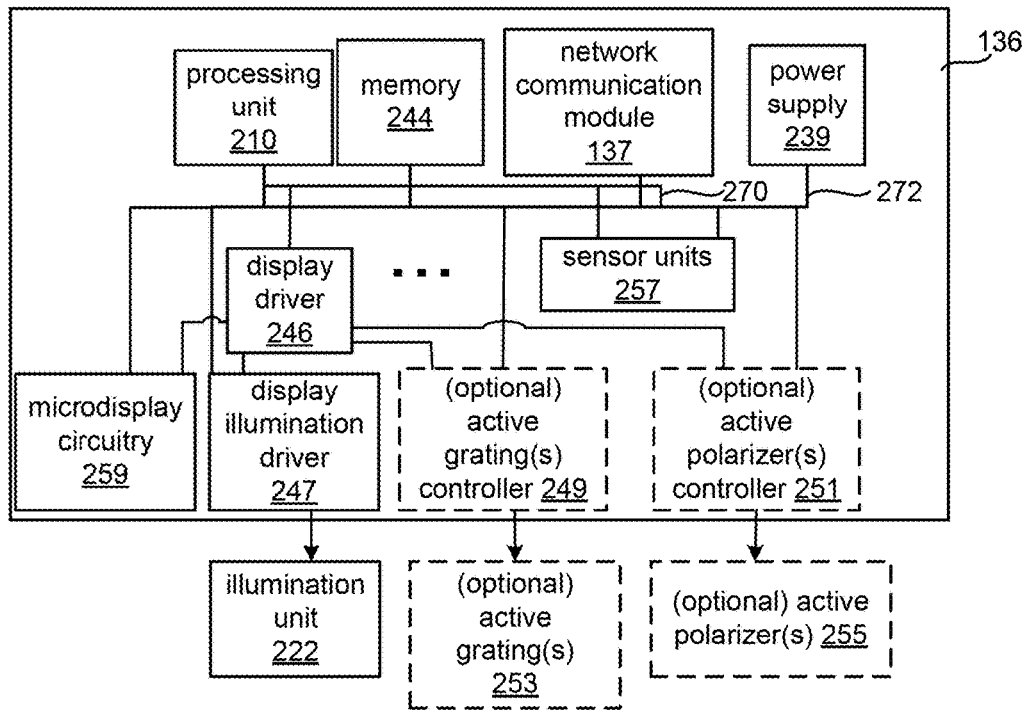
FIG. 2A is a block diagram of example hardware components in a control circuitry embodiment of a NED device.

FIG. 2A is a block diagram of example hardware components including a computing system within control circuitry of a NED device. Control circuitry 136 provides various electronics that support the other components of HMD 2. In this example, the control circuitry 136 for a HMD 2 comprises a processing unit 210, a memory 244 accessible to the processing unit 210 for storing processor readable instructions and data. A network communication module 137 is communicatively coupled to the processing unit 210 which can act as a network interface for connecting HMD 2 to another computing system such as the companion processing module 4, a computing system of another NED device or one which is remotely accessible over the Internet. A power supply 239 provides power for the components of the control circuitry 136 and the other components of the HMD 2 like the capture devices 113, the microphone 110, other sensor units, and for power drawing components for displaying image data on near-eye display 14 such as light sources and electronic circuitry associated with an image source like a microdisplay in a projection light engine.

The processing unit 210 may comprise one or more processors (or cores) such as a central processing unit (CPU) or core and a graphics processing unit (GPU) or core. In embodiments without a separate companion processing module 4, processing unit 210 may contain at least one GPU. Memory 244 is representative of the various types of memory which may be used by the system such as random access memory (RAM) for application use during execution, buffers for sensor data including captured image data and display data, read only memory (ROM) or Flash memory for instructions and system data, and other types of nonvolatile memory for storing applications and user profile data, for example. FIG. 2A illustrates an electrical connection of a data bus 270 that connects sensor units 257, display driver 246, processing unit 210, memory 244, and network communication module 137. Data bus 270 also derives power from power supply 239 through a power bus 272 to which all the illustrated elements of the control circuitry are connected for drawing power.

Figure 2B:
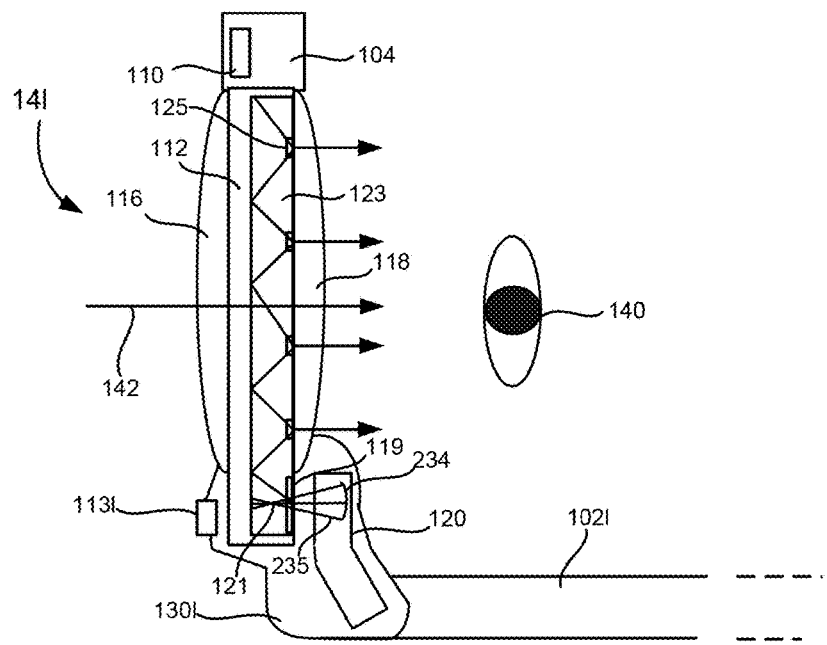
FIG. 2B is a top view of a near-eye display embodiment being coupled with a projection light engine having an external exit pupil.

Control circuitry 136 further comprises a display driver 246 for selecting digital control data (e.g. control bits) to represent image data that may be decoded by microdisplay circuitry 259 and different active component drivers of a projection light engine (e.g. 120 in FIG. 2B). A microdisplay, such as microdisplay 230 shown in FIG. 3C, may be an active transmissive, emissive or reflective device. For example, a microdisplay may be a liquid crystal on silicon (LCoS) device requiring power or a micromechanical machine (MEMs) based device requiring power to move individual mirrors. An example of an active component driver is a display illumination driver 247 which converts digital control data to analog signals for driving an illumination unit 222 which includes one or more light sources, such as one or more lasers or light emitting diodes (LEDs). In some embodiments, a display unit may include one or more active gratings 253, such as for a waveguide, for coupling the image light at the exit pupil from the projection light engine. An optional active grating(s) controller 249 converts digital control data into signals for changing the properties of one or more optional active grating(s) 253. Similarly, one or more polarizers of a projection light engine may be active polarizer(s) 255 which may be driven by an optional active polarizer(s) controller 251. The control circuitry 136 may include other control units not illustrated here but related to other functions of a HMD 2 such as providing audio output, identifying head orientation and location information.

FIG. 2B is a top view of an embodiment of a near-eye display 141 being coupled with a projection light engine 120 having an external exit pupil 121. In order to show the components of the display optical system 14, in this case 141 for the left eye, a portion of the top frame section 117 covering the near-eye display 141 and the projection light engine 120 is not depicted. Arrow 142 represents an optical axis of the near-eye display 141.

In this embodiment, the near-eye displays 141 and 14r are optical see-through displays. In other embodiments, they can be video-see displays. Each display includes a display unit 112 illustrated between two optional see-through lenses 116 and 118 and including a waveguide 123. The optional lenses 116 and 118 are protective coverings for the display unit. One or both of them may also be used to implement a user's eyeglass prescription. In this example, eye space 140 approximates a location of a user's eye when HMD 2 is worn. The waveguide directs image data in the form of image light from a projection light engine 120 towards a user's eye space 140 while also allowing light from the real world to pass through towards a user's eye space, thereby allowing a user to have an actual direct view of the space in front of HMD 2 in addition to seeing an image of a virtual feature from the projection light engine 120.

In this top view, the projection light engine 120 includes a birdbath optical element 234 illustrated as a curved surface. The curved surface provides optical power to the beams 235 of image light (also described as image light 235) it reflects, thus collimating them as well. Only one beam is labeled to prevent overcrowding the drawing. In some embodiments, the radius of curvature of the birdbath optical element is at least −38 millimeters (mm) The beams are collimated but come from different angles as they reflect from different points of the curved surface. Thus, the beams will cross and form the exit pupil 121 at the smallest cross-section of themselves.

In some embodiments, a waveguide 123 may be a multiple optical layer waveguide or a diffractive waveguide. Additionally, in some examples, a waveguide 123 is a surface relief grating (SRG) waveguide. In an embodiment as described herein, an input diffraction grating 119 couples an image light from a projection light engine 120. Additionally, a waveguide has a number of exit gratings 125 for an image light to exit the waveguide in the direction of a user's eye space 140. One exit grating 125 is labeled to avoid overcrowding the drawing. In this example, an outermost input diffraction grating 119 is wide enough and positioned to capture light exiting a projection light engine 120 before the light exiting the projection light engine has reached its exit pupil 121. The optically coupled image light forms its exit pupil in this example at a central portion of the waveguide. See FIG. 3B for a more detailed example. FIGS. 3A-B described herein provide an example of a waveguide coupling the image light at an exit pupil with an input diffraction grating positioned at the exit pupil.

The exit pupil 121 includes the light for the complete image being displayed, thus coupling light representing an image at the exit pupil 121 captures the entire image at once, and is thus very efficient and provides the user a view of the complete image in a near-eye display 14. An input diffraction grating 119 is able to couple an image light of an exit pupil 121 because the exit pupil 121 is external to the projection light engine 120. In an embodiment, an exit pupil 121 is 0.5 mm outside a projection light engine 120 or housing of the projection light engine. In other embodiments, the exit pupil 121 is projected 5 mm outside the projection light engine 120 or housing of the projection light engine.

Figure 4:
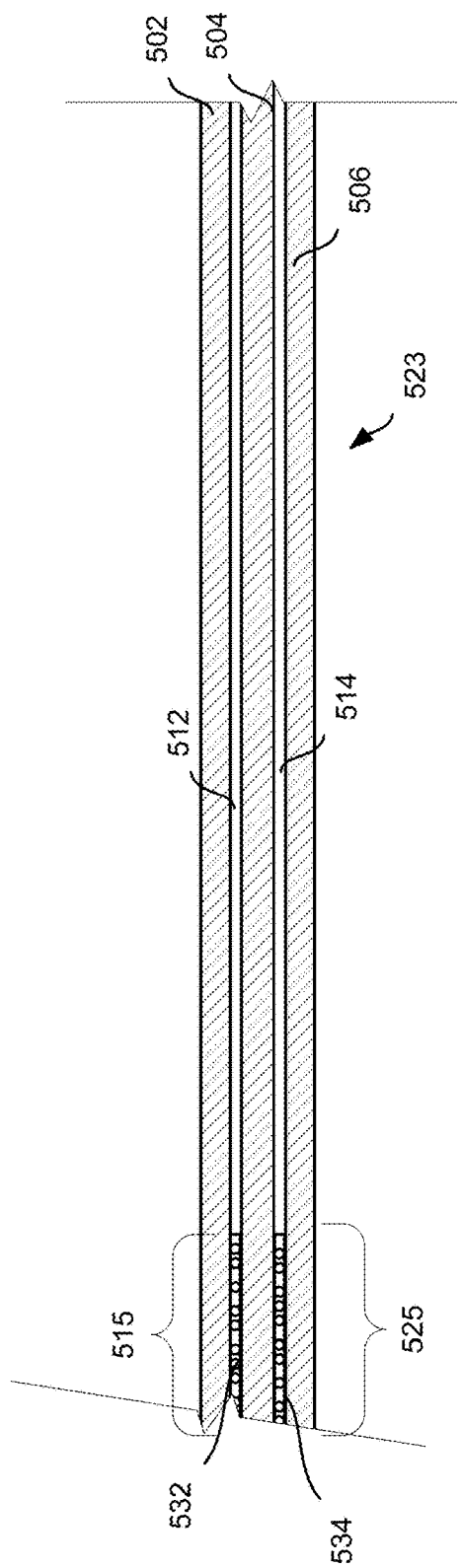
FIG. 4 is an enlarged cross-sectional view of a waveguide constructed in accordance with the technology.

In the illustrated embodiment of FIG. 2B, the projection light engine 120 in a left side housing 130l includes an image source, for example a microdisplay, which produces the image light and a projection optical system which folds an optical path of the image light to form an exit pupil 121 external to the projection light engine 120. The shape of the projection light engine 120 is an illustrative example adapting to the shape of the example of left side housing 130l which conforms around a corner of the frame 115 in FIG. 1 reducing bulkiness. The shape may be varied to accommodate different arrangements of the projection light engine 120, for example due to different image source technologies implemented. For example, FIG. 4 as described herein illustrates a different orientation. In an embodiment, a projection light engine 120 may include at least portions of components that are coplanar and may be disposed on a substrate, such as a single printed circuit board (PCB), as illustrated in FIG. 4 and described herein.

There are different image generation technologies that can be used to implement an image source, such as microdisplay 230 described herein. For example, a microdisplay can be implemented using a transmissive projection technology. In one example of such technology, a light source is modulated by optically active material; the material is usually implemented using a transmissive LCD type microdisplay with powerful backlights and high optical energy densities. Other microdisplays use a reflective technology for which light from an illumination unit is reflected and modulated by an optically active material. The illumination maybe a white source or RGB source, depending on the technology. Digital light processing (DLP), digital micromirror device (DMD) and LCOS are all examples of reflective technologies which may be used by the display. Additionally, a microdisplay can be self-emitting, such as a color-emitting organic light emitting diode (OLED) microdisplay or an array of LEDs.

LED arrays may be created conventionally on GaN substrates with a phosphor layer for spectral conversion or other color conversion method. Self-emissive displays may be relayed and magnified for a viewer.

FIG. 2B shows half of a HMD 2. For the illustrated embodiment, a full HMD 2 may include another display optical system 14 with another set of optional see-through lenses 116 and 118, another waveguide 123, as well as another projection light engine 120, and another of outward facing capture devices 113. In some embodiments, there may be a continuous display viewed by both eyes, rather than a display optical system for each eye. In some embodiments, a single projection light engine 120 may be optically coupled to a continuous display viewed by both eyes or be optically coupled to separate displays for the eyes. Additional details of a head mounted personal A/V apparatus are illustrated in U.S. patent application Ser. No. 12/905,952 entitled Fusing Virtual Content Into Real Content, Filed Oct. 15, 2010.

Figure 3:
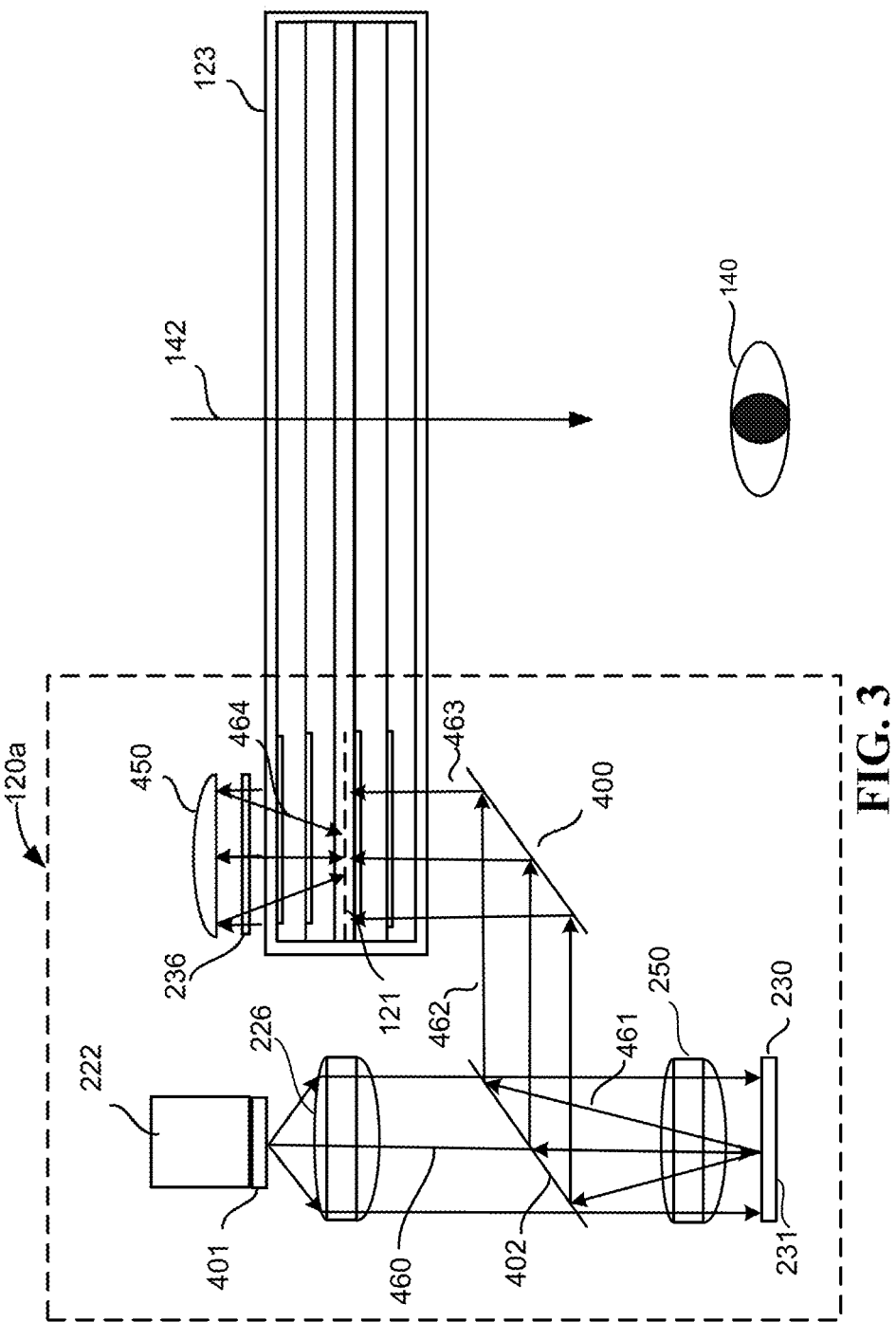
FIG. 3 is a block diagram of a compact projection light engine used in conjunction with the waveguide of the present technology.

FIG. 3 is a block diagram of an exemplary compact projection light engine 120a embodiment and waveguide 123 that may be disposed in a near-eye display. In an embodiment, waveguide 123 includes optical substrates 502, 504 and 506 illustrated in FIG. 4 and as described herein. In an embodiment, projection light engine 120a shown in FIG. 3C operates similarly to projection light engine 120 shown in FIG. 3A. In an embodiment, projection light engine 120a includes illumination unit 222, lenticular screen 401, doublet 226, PBS 402, doublet 250, microdisplay 230, fold mirror 400, curved reflector 450 and quarter waveplate 236. In an embodiment, like reference numerals refer to similar components described herein. In alternate embodiment, more or less components may be used in projection light engine 120a.

In this embodiment, an input diffraction grating 119 of a waveguide 123 couples the reflected beam at about an exit pupil 121. In this embodiment, waveguide 123 may be a single layer waveguide. Optionally, waveguide 123 may use the aforementioned holographic techniques to couple the output beam.

In an embodiment, image light is projected from projection light engine 120a to an exit pupil 121 in waveguide 123. The waveguide 123 may then provide image light to eye space 140. Arrow 142 represents an optical axis of a near-eye display 141. In an embodiment, an aperture of projection light engine 120a is 4 mm. In an embodiment, a projected exit pupil is 13 mm from the curved reflector 450.

In embodiments, components in projection light engine 120a are mounted on a common substrate, such as printed circuit board, in coplanar orientation. Other embodiments include other geometric orientations of components of projection light engine 120a. In an embodiment, projection light engine 120a has components that are at least partially coupled coplanar to a surface of a PCB.

In embodiments, curved reflector 450 provides focus control and may be a birdbath optical element having a curved reflector. In an embodiment, quarter waveplate 236 provides circular polarization. In an embodiment, two doublets are used and/or aspheric components are not used. In an embodiment, illumination unit 222 may include laser optics using prism injection or alternatively may be waveguided.

Some examples of illumination sources which the illumination unit 222 may include are light emitting diodes (LEDs) and lasers. In some embodiments, there may be separate red, green and blue (RGB) illumination sources, and in other embodiments, there may be a white light source and filters used to represent different colors. In this embodiment, a color sequential LED device is used in the illumination unit 222. The color sequential device includes red, blue and green LEDs which are turned on in a sequential manner in timing with the LCoS microdisplay for making a full color image. In other examples, lasers rather than LEDs may be used.

In an embodiment, PBS 402 is disposed near microdisplay 230 that may maximize sequential contrast. In an embodiment, the microdisplay 230 has a surface 231 which reflects light from an illumination unit 222 for representing the image data to be displayed.

Light 460 generated by the illumination unit 222 is directed through lenticular screen 401, doublet 226, PBS 402 and doublet 250 to a surface 231 of microdisplay 230. In an embodiment, lenticular screen 401 is a lens that may focus more of the light 460 into a horizontal beam. Light (or image light) 461 is then reflected from surface 231 through doublet 250 to PBS 402 that splits and polarizes image light 462 to fold mirror 400. Image light 463 is reflected from fold mirror 400 through quarter waveplate 236 to curved reflector 450. Image light 464 is reflected from curved reflector 450 and through quarter waveplate 236 to form an image (or portion thereof) at exit pupil 121 in waveguide 123. In an embodiment, image light 464 is diffracted by a first input diffraction grating in waveguide 123 while image light 463 is allowed to pass through the same first input diffraction grating un-deviated at approximately the same time from fold mirror 400. In an embodiment, waveguide 123 performs at least some of the functions of another PBS. In an embodiment, an external projected exit pupil is formed at eye space 140 as similar shown in FIG. 4A.

Image light 235 may have been polarized for more efficient coupling into one or more input diffraction gratings, such as the one or more input diffraction gratings of a diffractive waveguide. In some examples, a waveguide may have multiple layers, and the polarization of the incoming image light can be used for filtering the incoming light to different layers of the waveguide. Each layer may have its own input diffraction grating and exit grating. An input diffraction grating for a layer couples light of a certain polarization into its layer. Light of other polarizations is passed through the input diffraction grating and the layer itself so that an input diffraction grating of the next layer either couples or passes the received light based on its polarization. In some implementations, different wavelength bands or sets of wavelengths of light, such as for different colors, may be directed to different waveguide layers for enhancing brightness of the image. Light in the different wavelength bands may be polarized for coupling into a respective layer for each wavelength band.

Optical elements described herein may be made of glass or plastic material. Optical elements may be manufactured by molding, grinding and/or polishing. Optical elements may or may not be cemented to each other in embodiments. Optical elements described herein may be aspherical. In embodiments, single lens optical elements may be split into multiple lens elements. Better image quality may be achieved by replacing single lens optical elements with multiple lens optical elements so more lens are used and hence more properties are available to be varied to achieve a particular image quality.

FIG. 4 is an enlarged partial view of a multiple layer waveguide 523 having multiple substrates in a stacked plate waveguide which may comprise any of the waveguides disclosed herein. The waveguide 523 is comprised of a plurality of optical substrates joined by mechanically spaced pressure sensitive adhesive (PSA) material. In one embodiment, a double sided PSA tape is used during formation of the waveguide. In a unique aspect of the technology, the pressure sensitive adhesive includes a plurality of microspheres which allow mechanical spacing between the substrates to be maintained.

FIG. 4 illustrates three optical substrates 502, 504, 506 separated by air gaps 512, 514. Pressure sensitive adhesive is provided in contact regions 515, 525, between the optical substrates. Microspheres 532, 534, all having a common diameter and comprised of, for example, glass, are embedded in the pressure sensitive adhesive. Microspheres may be clear and/or colored to match a particular application. For example, if a black frame outline is used, black microspheres may be used in the PSA. In one embodiment, the contract regions 515, 525 are vertically aligned and are located in a region of the waveguide which is outside a field of view of a user's eye when the waveguide is assembled as part of the device 2 of FIG. 1. (In one embodiment, waveguide 523 may comprise waveguide 123 of FIG. 2B.) The pressure sensitive adhesive may be PSA tape having the microspheres embedded therein prior to application to the substrate. In one embodiment, the microspheres between respective substrate layers may have different diameters. That is, all of microspheres 532 may have one common diameter while microspheres 534 may have a second, different common diameter. The diameter of the microspheres is selected taking into account the desired spacing between the optical substrates, the material used for the spheres, and the pressure applied to the substrates during assembly of the waveguide. The optical substrates may have the same or different optical characteristics. Optical characteristics of the substrates which may be varied include the material comprising the substrate, the substrate's index of refraction, the substrate thickness, and the like.

In one embodiment, a PSA tape having embedded microspheres is provided and used to assemble the waveguide. The embedded microspheres may be provided at the time of manufacture of the PSA tape or during manufacture of the waveguide. As noted above, the microspheres may be glass. In an another embodiment, the spheres may be silica, or a combination of glass and silica. Use of silica allows the spheres to act as a desiccant to improve the overall characteristics of the optical structure created.

The term pressure sensitive adhesive "PSA" may be generally understood to mean a dry-contact adhesive, generally of viscoelastic nature, which requires only slight pressure to adhere to the contact surface. PSAs are characterized by the fact that they require no activation by water, by a solvent or by heating in order for them then to adhere permanently to a contact surface. Pressure-sensitive adhesives are manufactured with either a liquid carrier or in solid form. Articles such as tapes and labels are made from liquid PSAs by coating the adhesive on a support and evaporating the organic solvent or water carrier, usually in a hot air dryer. The dry adhesive may be further heated to initiate a cross-linking reaction and increase molecular weight. 100% solid PSAs may be low viscosity polymers that are coated and then reacted with radiation to increase molecular weight and form the adhesive (radiation cured PSA); or they may be high-viscosity materials that are heated to reduce viscosity enough to allow coating, and then cooled to their final form (hot melt PSA, HMPSA).

PSA construction may comprise a combination of layers including a facestock (label) or backing (tape), an optional primer coat, an adhesive, and a silicone release coating on a protective liner. The PSA construction—whether a label, tape or transfer adhesive—is manufactured through one to several coating and laminating steps, including liner-release coating, adhesive coating/drying/curing, optional facestock or backing primer coating, and lamination of the facestock or backing to the liner.

The production of the PSA used herein may be tailored using coating and laminating process. Primary coating and laminating is accomplished on a coating line and produces an adhesive sandwich. PSA coaters are typically tandem coaters on which the two separate substrate webs (facestock/backing) and liner are processed simultaneously prior to laminating them together. Processing of the liner often includes application and drying of the release coating. Processing of the facestock/backing may include application and drying of a primer coat. Actual adhesive coating may be done through direct application to the facestock/backing or by transfer application to the liner. The facestock/backing and liner webs are then laminated together to form the PSA sandwich.

The solved adhesive is transported to the coating device, after which the adhesive is coated in an even layer onto the backing and dried in the drying channel until all the solvents have evaporated. The result is a long roll of tape. After the coating process, the long rolls are converted into the desired roll sizes.

Advantageously, the pressure-sensitive adhesive (PSA) used in the present technology may be chosen from the following group (as non-limiting examples): PSAs of general compositions based on polyacrylates, polymethacrylates or ethylenic copolymers, such as ethylene/vinyl acetate, ethylene/ethyl acrylate and ethylene/ethyl methacrylate copolymers; PSAs based on synthetic rubber and elastomers, including silicones, polyurethanes, styrene-butadienes, polybutadienes, polyisoprenes, polypropylenes and polyisobutylenes; PSAs based on polymers comprising nitriles or acrylonitriles; PSAs based on polychloroprene; PSAs based on block copolymers comprising polystyrene, polyethylene, polypropylene, polyisoprene or polybutadiene blocks; and blends of these polymers. The PSAs may also contain one or more additives, chosen from tackifiers, plasticizers, binders, antioxidants, stabilizers, pigments, dyes, dispersants and scattering agents.

The thickness of the adhesive layer is generally between 10 and 50 µm, preferably between 15 and 30 µm.

A number of adhesive coating methods are used for coating pressure-sensitive adhesives. Many are pre-metered methods in which the thickness of the adhesive is determined prior to the actual application of the PSA to the web substrate, while other methods are post-metered methods in which the thickness of the PSA is determined after the adhesive has been applied to the web substrate.

The actual choice of which adhesive coating technique and coating method is to be used is dependent on a number of factors, including: the desired PSA thickness; the viscosity of the adhesive layer; the PSA technology (solvent, emulsion, hot melt or 100% solids); the solids content of the PSA package; the web material to be coated and what are its surface characteristics; and coating weight accuracy is required (final adhesive thickness+/−). As noted above, the microspheres may have a common diameter. As used herein, a common diameter includes microspheres having a diameter plus or minus a difference of 10-20 percent. In manufacturing the microsphere embedded PSA, commercially available microspheres may have a difference in their actual sizes. In accordance with the technology, the distribution and number of spheres used can account for this difference in relative size, or higher tolerances in the difference in sphere diameter can be held.

A first process for assembling the waveguide includes providing a first transparent optical substrate having a first optical characteristic; applying a PSA including microspheres or PSA tape having microspheres incorporated therein to a portion of the substrate not encompassing a field of view through the waveguide; providing a transparent optical substrate having a second optical characteristic (which may be the same as or different than the first optical characteristic); contacting the second transparent optical substrate to the PSA or PSA tape applied to the first substrate; and applying uniform pressure over a contact area of the PSA or PSA tape to adhere the substrates together. The process may further include: applying a second PSA including microspheres or PSA tape having microspheres incorporated therein to a portion of the second optical substrate not encompassing a field of view through the waveguide (and optionally vertically aligned with the PSA or PSA tape applied to the first optical substrate); providing a third transparent optical substrate having a third optical characteristic (which may be the same as or different than the first and/or second optical characteristic); contacting the third transparent optical substrate to the second PSA or PSA tape applied to the second substrate; and applying uniform pressure over a contact area of the second PSA or PSA tape to adhere the second and third substrates together.

A second process for assembling the waveguide includes providing a first transparent optical substrate having a first optical characteristic of the waveguide; applying a PSA or PSA tape to a portion of the substrate not encompassing a field of view through the waveguide; applying a plurality of microspheres to the PSA area; providing a transparent optical substrate having a second optical characteristic (which may be the same as or different than the first optical characteristic); contacting the second transparent optical substrate to the PSA or PSA tape applied to the first substrate; and applying uniform pressure over a contact area of the PSA or PSA tape to adhere the substrates together. The process may further include: applying a second PSA or PSA tape to a portion of the second optical substrate not encompassing a field of view through the waveguide (and optionally vertically aligned with the PSA or PSA tape applied to the first optical substrate); applying a plurality of microspheres to the second PSA area providing a third transparent optical substrate having a third optical characteristic (which may be the same as or different than the first and/or second optical characteristic); contacting the third transparent optical substrate to the second PSA or PSA tape applied to the second substrate; and applying uniform pressure over a contact area of the second PSA or PSA tape to adhere the second and third substrates together, Where the microspheres are provided during manufacture of PSA tape (as in the first process), no separate application of microspheres is used during the PSA application. Microsphere loading relative to a PSA surface area may be in a range of 1 to 10 percent of the surface area. The amount of microspheres used by be comprised of glass and have a diameter in the range of 10 microns to 200 microns, again depending on the nature and characteristics of the desired waveguide. It will be understood that the dimensions of the microspheres may be varied in accordance with the application for which the waveguide is designed, the optical characteristics of the waveguide, and other factors.

Where the microspheres are provided after application of the PSA to the substrate, application of the microspheres may occur during the so-called B-staging where, in between adhesive application, assembly and curing, the product can be held for a period of time, without sacrificing performance.

The example computing systems illustrated in the figures include examples of computer readable storage devices. A computer readable storage device is also a processor readable storage device. Such devices may include volatile and nonvolatile, removable and non-removable memory devices implemented in any method or technology for storage of information such as computer readable instructions, data structures, program modules or other data. Some examples of processor or computer readable storage devices are RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other device which can be used to store the information and which can be accessed by a computing system.

ASPECTS OF CERTAIN EMBODIMENTS

Embodiments of the technology include an optical waveguide apparatus. The apparatus comprises a first optical substrate; a second optical substrate; and a pressure sensitive adhesive including a first plurality of embedded microspheres all having a first common diameter and embedded in the adhesive, the adhesive positioned between the first optical substrate and the second optical substrate and configured to bond the first optical substrate to the second optical substrate.

An additional embodiment of the technology includes an apparatus of any of the previous embodiments wherein the pressure sensitive adhesive comprises a dual sided adhesive tape.

Additional embodiments of the technology include an apparatus of any of the previous embodiments wherein the microspheres have a diameter of about 10 microns to 200 microns.

Additional embodiments of the technology include an apparatus of any of the previous embodiments wherein the apparatus is included in a near-eye display device having a projection light engine and near-eye display, the waveguide configured as a portion of a micro display.

Additional embodiments of the technology include an apparatus of any of the previous embodiments including one or more additional substrates, each additional substrate coupled to a previously bonded substrate by a pressure sensitive adhesive having a plurality of embedded microspheres.

Additional embodiments of the technology include an apparatus of any of the previous embodiments further including a third substrate coupled to the substrate by a pressure sensitive adhesive including a second plurality of microspheres, the second plurality of microspheres all having a second common diameter different than the first common diameter.

Additional embodiments of the technology include an apparatus of any of the previous embodiments further including a third substrate coupled to the substrate by a pressure sensitive adhesive including a second plurality of microspheres, the second plurality of microspheres all having the first common diameter.

Additional embodiments of the technology include an apparatus of any of the previous embodiments wherein the waveguide is configured as a micro display and the apparatus further including a third substrate coupled to the substrate by a pressure sensitive adhesive including a second plurality of microspheres, wherein the pressure sensitive adhesive including the first plurality of microspheres and the pressure sensitive adhesive including the second plurality of microspheres are each provided in a respective contact region outside a field of view of the micro display.

Another embodiment of the technology includes a method of assembling a waveguide. The method includes providing a first transparent optical substrate having a first optical characteristic; applying a pressure sensitive adhesive in a contact area having a plurality of microspheres incorporated therein to a first contact portion of the substrate not encompassing a field of view through the waveguide; providing a second transparent optical substrate having a second optical characteristic; contacting the second transparent optical substrate to the pressure sensitive adhesive applied to the first substrate; and applying uniform pressure over the contact area to adhere the substrates together.

Additional embodiments of the technology include a method as in any of the previous embodiments wherein the pressure sensitive adhesive is applied as a pressure sensitive adhesive tape including the plurality of microspheres embedded therein prior to said applying.

Additional embodiments of the technology include a method as in any of the previous embodiments wherein said applying comprises depositing a pressure sensitive adhesive followed by applying the plurality of microspheres prior to said the contacting.

Additional embodiments of the technology include a method as in any of the previous embodiments further including: applying pressure sensitive adhesive having microspheres incorporated therein to a second contact portion on the second optical substrate not encompassing a field of view through the waveguide; providing a third transparent optical substrate having a third optical characteristic; contacting the third transparent optical substrate to the second contact portion of pressure sensitive adhesive;
and applying uniform pressure over the second contact portion to adhere the second and third substrates together.

Additional embodiments of the technology include a method as in any of the previous embodiments wherein the contact area and the second contact portion are vertically aligned relative to the first and second substrates.

Additional embodiments of the technology include a method as in any of the previous embodiments wherein the first and second optical characteristics are different.

Additional embodiments of the technology include a method as in any of the previous embodiments further including: applying pressure sensitive adhesive to a second contract portion of the second optical substrate not encompassing a field of view through the waveguide; depositing a plurality of microspheres in the pressure sensitive adhesive; providing a third transparent optical substrate having a third optical characteristic; contacting the third transparent optical substrate to the second contact portion; and applying uniform pressure over second contact portion to adhere the second and third substrates together.

The technology further includes an apparatus as in any of the previous embodiments including a computer system that provides an electronic signal representing image data; and a head-mounted display that provides image light in response to the electronic signal, wherein the head-mounted display includes: a waveguide display including: a first optical substrate having at least a first optical characteristic; a second optical substrate having at least a second optical characteristic; a third optical substrate having at least a third optical characteristic; a first contact region of pressure sensitive adhesive tape including a first plurality of embedded microspheres all having a first common diameter and embedded in the adhesive, the first contact region positioned between the first optical substrate and the second optical substrate and configured to bond the first optical substrate to the second optical substrate; and a second contact region of pressure sensitive adhesive tape including a second plurality of embedded microspheres all having a second common diameter and embedded in the adhesive, the second contact region positioned between the second optical substrate and the third optical substrate and configured to bond the second optical substrate to the third optical substrate.

The technology includes an apparatus as in any of the previous embodiments wherein the microspheres have a diameter of about 10 microns to 200 microns.

The technology includes an apparatus as in any of the previous embodiments including one or more additional substrates, each additional substrate coupled to a previously bonded substrate by a contact region of pressure sensitive adhesive including a plurality of embedded microspheres.

The technology includes an apparatus as in any of the previous embodiments wherein the first optical characteristic and the second optical characteristic are different.

The technology includes an apparatus as in any of the previous embodiments 19 wherein the first contact regions and the second contact regions are each provided outside a field of view of the head mounted display.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts that would be recognized by one skilled in the art are intended to be within the scope of the claims.

What is claimed is:
1. A head-mounted display, comprising:
a frame;
a projection light engine supported by the frame; and
a display optical system supported by the frame, the display optical system including a waveguide display comprising:
layered first and second optical substrates configured to direct light from the projection light engine toward an eye space of a wearer of the head-mounted display, the first and second optical substrates defining an air gap between the first and second optical substrates that is configured to be within a field of view of the wearer, and
a double sided pressure sensitive adhesive tape positioned in a contact region between the first optical substrate and the second optical substrate outside the field of view of the wearer such that the double sided pressure sensitive adhesive tape does not interrupt the field of view of the wearer, a first side of the double sided pressure sensitive adhesive tape bonded to the first optical substrate and a second side of the double sided pressure sensitive adhesive tape bonded to the second optical substrate, a height of the air gap between the first and second optical substrates based at least in part on a distribution and a number of microspheres embedded in the double sided pressure sensitive adhesive tape within the contact region.

2. The head-mounted display of claim 1, wherein the microspheres have a diameter of about 10 microns to 200 microns.

3. The head-mounted display of claim 1, including one or more additional optical substrates, each additional optical substrate coupled to a previously bonded optical substrate by an additional pressure sensitive adhesive including additional embedded microspheres.

4. The head-mounted display of claim 1, wherein indexes of refraction of the first optical substrate and the second optical substrate are substantially the same.

5. The head-mounted display of claim 1, wherein the distribution and the number of the microspheres is used to overcome a relative size difference between individual microspheres such that the height of the air gap is maintained.

6. The head-mounted display of claim 5, wherein the height of the air gap is based at least in part on desired optical characteristics of the waveguide display.

7. The head-mounted display of claim 1, wherein the first optical substrate has a first optical characteristic and the second optical substrate has a second optical characteristic that is different than the first optical characteristic.

8. The head-mounted display of claim 7, wherein the first optical characteristic and the second optical characteristic are different indexes of refraction.

9. A head-mounted display, comprising:
a frame;
a projection light engine supported by the frame; and
a display optical system supported by the frame, the display optical system including a waveguide display comprising:
first, second, and third optical substrates defining a first air gap between the first and second optical substrates and a second air gap between the second and third optical substrates, the head-mounted display configured to align the first and second air gaps with a field of view of a wearer of the head-mounted display such that the waveguide display directs light from the projection light engine toward an eye space of the wearer,
a first double sided pressure sensitive adhesive tape positioned in a first contact region between the first and second optical substrates and a second double sided pressure sensitive adhesive tape positioned in a second contact region between the second and third optical substrates, the first and second contact regions configured to be outside the field of view of the wearer,
first microspheres and second microspheres embedded in the first and second double sided pressure sensitive adhesive tapes, respectively, such that a first height of the first air gap and a second height of the second air gap are based at least in part on diameters of the first and second microspheres.

10. The head-mounted display of claim 9, wherein the first and second microspheres are not in the field of view of the wearer.

11. The head-mounted display of claim 9, wherein the first height of the first air gap is based at least in part on a distribution and a number of the first microspheres.

12. The head-mounted display of claim 9, wherein the first height of the first air gap is based at least in part on first diameters of the first microspheres, the first diameters including a base microsphere diameter plus or minus a difference of between 10 and 20 percent of the base microsphere diameter.

13. The head-mounted display of claim 9, wherein the first height of the first air gap is different than the second height of the second air gap.

14. The head-mounted display of claim 9, wherein the first and second contact regions are aligned outside the field of view of the wearer.

15. An apparatus, comprising:
a head-mounted display frame configured to be worn by a user;
a projection light engine mounted on the head-mounted display frame; and
a near-eye display mounted on the head-mounted display frame configured to be positioned in a field of view of the user, the near-eye display comprising:
layered optical substrates defining air gaps between the optical substrates, the head-mounted display frame configured to align the air gaps with the field of view of the user such that the air gaps improve optical characteristics of the near-eye display,
pressure sensitive adhesive positioned in contact regions between the layered optical substrates and outside the field of view of the user,
microspheres embedded in the pressure sensitive adhesive outside the field of view of the user such that heights of the air gaps are based at least in part on diameters of the microspheres.

16. The apparatus of claim 15, wherein individual optical substrates of the layered optical substrates have different optical characteristics.

17. The apparatus of claim 16, wherein the different optical characteristics of the individual optical substrates are selected to enhance a quality of an image presented to the user within the near-eye display.

18. The apparatus of claim 15, wherein the microspheres are at least partially comprised of silica.

19. The apparatus of claim 18, wherein the silica acts as a desiccant within the air gaps.

20. The apparatus of claim 19, wherein the air gaps improve the optical characteristics of the near-eye display where the silica acts as the desiccant.

* * * * *